United States Patent
Do

(10) Patent No.: US 6,490,613 B1
(45) Date of Patent: Dec. 3, 2002

(54) ARRANGEMENT FOR EXTENDING SERVICE SUPPORT IN A COMMUNICATION SYSTEM

(75) Inventor: Thanh Van Do, Oslo (NO)

(73) Assignee: Telefonaktiebolaget LM Ericsson (publ), Stockhom (SE)

(*) Notice: Subject to any disclaimer, the term of this patent is extended or adjusted under 35 U.S.C. 154(b) by 0 days.

(21) Appl. No.: 09/412,335

(22) Filed: Oct. 5, 1999

Related U.S. Application Data

(63) Continuation of application No. PCT/NO98/00110, filed on Apr. 2, 1998.

(30) Foreign Application Priority Data

Apr. 8, 1997 (NO) .............................................. 971605

(51) Int. Cl.⁷ .............................................. G06F 11/30
(52) U.S. Cl. ....................... 709/202; 709/224; 709/201
(58) Field of Search ................................ 709/202, 201, 709/224

(56) References Cited

U.S. PATENT DOCUMENTS

| | | | | |
|---|---|---|---|---|
| 5,291,479 | A | | 3/1994 | Vaziri et al. ................. 370/264 |
| 5,509,053 | A | | 4/1996 | Gowda et al. ............... 455/465 |
| 5,572,528 | A | | 11/1996 | Shuen ......................... 370/402 |
| 5,608,447 | A | | 3/1997 | Farry et al. .................. 725/116 |
| 5,615,351 | A | | 3/1997 | Loeb ............................ 700/90 |
| 5,825,759 | A | * | 10/1998 | Liu .............................. 370/331 |
| 5,974,441 | A | * | 10/1999 | Rogers et al. ............... 709/200 |
| 6,049,819 | A | * | 4/2000 | Buckle et al. ............... 709/202 |
| 6,076,099 | A | * | 6/2000 | Chen et al. .................. 709/202 |
| 6,085,086 | A | * | 7/2000 | La Porta et al. ............ 455/432 |
| 6,233,446 | B1 | | 5/2001 | Do .............................. 455/410 |
| 6,275,709 | B1 | | 8/2001 | Do .............................. 455/461 |
| 6,332,081 | B1 | * | 12/2001 | Do .............................. 455/461 |
| 6,336,130 | B1 | * | 1/2002 | Do .............................. 709/202 |
| 6,389,037 | B1 | | 5/2002 | Do .............................. 370/469 |

FOREIGN PATENT DOCUMENTS

| | | |
|---|---|---|
| EP | 0 684 741 A1 | 11/1995 |
| WO | 95/35611 | 12/1995 |
| WO | 96/25012 | 8/1996 |

OTHER PUBLICATIONS

IEEE 46th Vehicular Technology Conference, Apr. 28–May 1, 1996, Atlanta, Georgia, pp. 1825–1829, van Thanh et al., "Making Mobility Transparent to the Applications".

Telektronikk, vol. 90, No. 2, 1994, Norway, pp. 72–79, T. Handegård, "The TINA Consortium".

International Conference on Network Protocols, Nov. 1995, Tokyo, Japan, pp. 296–304, Choong Seon Hong et al., "Service and connection management architecture for distributed multimedia application".

IEEE Communications Magazine, vol. 36, No. 3, Mar. 1998, France, Juan Pavón et al., pp. 72–79, "CORBA for Network and Service Management in the TINA Framework".

U.S. patent application Ser. No. 09/412,334, filed Oct. 5, 1999, Thanh Van Do, "Arrangement for Improving Availability of Services in a Communication System".

* cited by examiner

Primary Examiner—Kenneth R. Coulter
(74) Attorney, Agent, or Firm—Nixon & Vanderhye, PC

(57) ABSTRACT

The present invention relates generally to an arrangement for extending service support in a communications system, especially a telecommunications system, said system comprising distributed hardware and software components which interact in order to provide services to one or more users, and the improvement is primarily implemented by introducing in said system an interface which also provides services to mobility-based applications. More specifically there is according to the present invention introduced a service interface for mobility-based applications for thereby providing the applications in question with location information.

7 Claims, 1 Drawing Sheet

The Informer object provides location information service to the applications

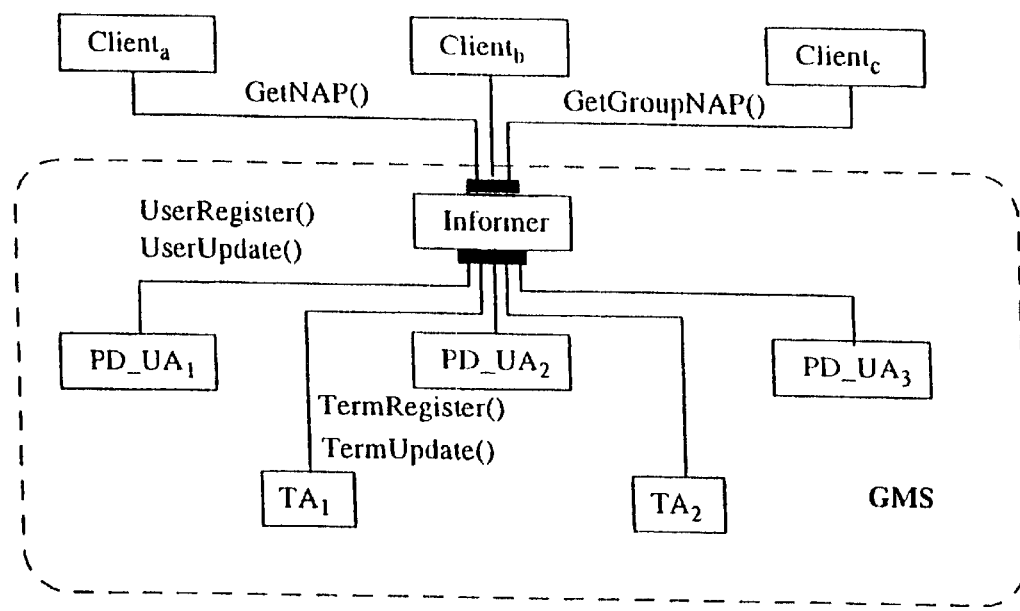
Figure 1  The Informer object provides location information service to the applications

ARRANGEMENT FOR EXTENDING SERVICE SUPPORT IN A COMMUNICATION SYSTEM

This is a continuation of PCT application No. PCT/NO98/00110, filed Apr. 2, 1998, the entire content of which is hereby incorporated by reference in this application.

FIELD OF THE INVENTION

The present invention relates to an arrangement for extending service support in a communications system, especially a telecommunications system, said system comprising distributed hardware and software components which interact in order to provide services to one or more users.

More specifically the present invention has been developed in connection with such an arrangement in order to provide improved service interface for mobility-based applications.

BACKGROUND OF THE INVENTION

By application is meant a distributed system consisting of a set of objects that interact and make use of the functions supported by the Distributed Processing Engineering, DPE, to perform certain functions. An application is designed and implemented by an application designer.

When an application is configured and installed in the telecom system domain or Service Provider system,. it becomes a service to be offered to the user. Several applications can be combined and offered as one service to the user.

Further, a service is brought to the user through a session, the session concept being adopted for example from the TINA service architecture, but possible with some different interpretation.

Briefly, a session may be defined as a period of activity that a user has with the telecom system domain or service provider domain.

MOBILITY-BASED APPLICATIONS

A mobility-based application is a type of application which was born with the introduction of mobility in the telecom system domain and which uses actively mobility related information in the realisation of its mission. In fact, without mobility such an application is meaningless.

Examples of such mobility-based application are taxi dispatch, fleet management, public safety, trucking, etc. Other mobility-based applications are information services to mobile users. For instance, traffic information or weather reports will be filtered based upon the current position of the user, while stock information will be filtered using the user profile. Another example of information services is a local Yellow-pages service extended with on-line information such as movies currently playing at local theatres or merchandise on sale at the local supermarket [IB94].

STATE OF THE ART AND PROBLEMS RELATED THERETO

There is no such well-defined service interface for mobility-based applications in current mobile networks and systems such as GSM (Global System for Mobile Communication), UPT (Universal Personal Telecommunication), etc. and definitely not in the future mobile distributed system.

OBJECTS OF THE PRESENT INVENTION

An object of the present invention is to provide an arrangement whereby the application design can be improved in relation to prior art.

Another object of the present invention is to provide an arrangement wherein the information contained in a mobile distributed system can be utilised in a far more effective manner.

Another object of the present invention is to provide an arrangement by which a service interface is offered by a mobile distributed system to mobility-based applications.

A still further object of the present invention is to provide such a service interface which contains a set of operations that any mobility-based applications can request in order to obtain for example desired location information.

BRIEF SUMMARY OF THE INVENTION

The above objects are achieved in an arrangement as stated in the preamble, which is characterised by the features as stated in the enclosed patent claims.

Further features and advantaged of the present invention will appear from the following description taken in conjunction with the enclosed drawing, as well as from the appending patent claims.

BRIEF DISCLOSURE OF THE DRAWING

FIG. 1 illustrates schematically an embodiment of the present invention, especially the introduction of an informer object in a generic mobility system, which object provides local information service to the applications in question.

DETAILED DESCRIPTION OF EMBODIMENTS

In the following, and with reference to the enclosed FIG. 1, there will be given a detailed description of an embodiment according to the present invention.

A common requirement for all the mobility-based application is to obtain the location information of a user of a group of users. This information is used in further processing and decision processes which are application specific.

To clarify this, let us take the example of taxi dispatch. When the "real-time" locations of all the taxis are knows, it is possible to identify the available able taxi closest to the customer.

SOLUTION

Let us call a mobile distributed system GMS (Generic Mobility System).

In order to support terminal and user mobility a GMS does hold some form of location information. Although the GMS's location information may not correspond totally to the location information needed by the mobility-based application, they may be transformed and become useful.

The GMS has the following capabilities:
1. At any time and for any user the GMS can find the terminals the user is currently using and the terminals at which he wants to receive incoming applications if there is any.
2. At any time and for any terminal, the GMS can find the NAP (Network Access Point) or the NAP coverage area where the terminal is currently located. A cell is an example of such an NAP coverage area which is covered by a base station in mobile cellular networks, such as GSM.

3. From 1 and 2 above it is possible to deduce: at any time and for any user the GMS can find the NAP coverage area in which the user is currently located (if there is any).
4. The GMS has also history data related to the movement of every terminal and every user.

If the NAP coverage area 1 is very large (e.g. city size) then the information about in which cell the user can currently be reached, may not be relevant for some applications, e.g. taxi dispatch, but may still be interesting for other applications.

The level of usefulness of the location information held by the GMS depends both on the configuration of the telecom system domain and the requirements of the application using it. We shall not discuss this further but concentrate rather on how to provide the necessary operations which can be invoked by the applications to obtain the required information from the GMS.

We introduce a computational object called Informer which has the following basic operations that can be invoked from the applications:

Operation to get the NAP coverage in which the user is located: GetNapOfUser (in Userid, out NAPid, out Status)

Operation to get the NAPs of a group of users: GetGroupNapOfUsers (in GroupId, otu ListOfNap, out Status)

Operations to get the terminals of a group of users GetTerminalOfUser1 (in Userid, out Terminalid, outStatus)

Operation to get the terminals of a group of users GetGroupTerminalOfUser (in GroupId, out ListOfTerm, out Status)

Operation to get the NAP coverage in which the terminal is located: GetNapOfTerminal (in Userid, outNAPid, out Status)

Operation to get the NAPs of a group of users: GetGroupNapOfTerminals (in GroupId, out ListOfNap, out Status)

The Informer may also have operation to get history data of a user or a terminal such as:

Operation to get history data of a user: GetHistoryOfUser (in Userid, out report, out Status)

Operation to get history data of a terminal: GetHistoryOfTerminal (in Userid, out report, out Status)

In order to obtain the location information, the Informer object needs assistance from the other objects of the GMS.

Let assume that the GMS uses agent technique to keep track of user and terminal, i.e. one agent PD_UA (ProviderDomain_UserAgent) is defined for each user and one TA (TerminalAgent) is defined for each terminal.

The Informer object needs assistance from both the PD_UAs and the TAs. All the users and terminals whose location should be available to the applications must be registered by the Informer object. Every time the user is registrated with the User_Registration object (object containing user registration information), the PD_UA has to notice the Informer object. This can be set up at subscription. The same applies for the terminal. Every time the TA update the NAPid saved in the Terminal_Data (object containing terminal location information), the TA must notice the Informer object. This may also be configured at subscription time.

The Informer object should have the following additional operations:

UserRegister (in Userid, in PD_UAref, out Status)
TerminalRegister (in Userid, in TAref, out Status)
UserUpdate (in Userid, in Terminalid, out Status)
TermUpdate (in Userid, in NAPid, out Status)

As shown in FIG. 1, the first group of operations we specified is used by. client objects in the applications (three clients are shown in the Figure) in order to get location information while the second group is used by internal object of the GMS to supply information to the Informer object.

Important Features of the Invention may be Listed as Follows

1: A service interface for mobility-based applications is introduced to provide applications with location information that a mobile distributed system holds.
2: Such a service interface is implemented by an object called Informer that has operations to request location information of one user, one group of users, one terminal, one group of terminals and also operations to request history data of users and terminals.

MERITS OF THE INVENTION

The invention promotes an additional use of already available information, namely location information in every distributed mobile system. The location information is supplied to a new range of applications called mobility-based applications which offer better assistance and services to the users.

What is claimed is:

1. Arrangement for extending service support in a communications system, especially a telecommunications system, said system comprising distributed components which interact in order to provide services to one or more users, characterized in introducing in said system an interface which also provides services to mobility-based applications, said service interface comprises an object called Informer, the basic operations of the Informer object consist of operation to query the location of one user, operation to query locations, i.e., the Network access point (NAP) of a group of users, operation to query the terminal currently used by one user, operation to query the terminals currently used by a group of users, operation to query the location of a terminal and operation to query the locations of a group of terminals, which information is obtained in cooperation with objects of the communication system in question through agent technique.

2. Arrangement as claimed in claim 1, characterized in that the operations of the Informer object in addition comprises operation to get history data of a user and operation to get history operation of a terminal.

3. Arrangement as claimed in claim 1, characterized in that all users and terminals whose location should be available to the applications is registered by the Informer object.

4. Arrangement as claimed in claim 3, characterized in that said location information comprises already available information being held by said communications system.

5. Arrangement as claimed in claim 4, characterized in that said Informer object, which is a computation object, comprises basic operations which can be invoked from any application.

6. Arrangement as claimed in claim 1, characterized in that said interface and the support related thereto, are introduced in any open distributing processing (ODP) system or any generic mobility system (GMS), and that said Informer object is adapted to co-operate with other objects in said systems.

7. Arrangement as claimed in claim 6, characterized in that there is defined one user agent for each user and one terminal agent for each terminal.

* * * * *